Patented Feb. 9, 1943

2,310,308

UNITED STATES PATENT OFFICE 2,310,308

ALLOY

Raymond L. Morrison, Buffalo, N. Y., assignor to Morrison Railway Supply Corporation, Buffalo, N. Y., a corporation of New York No Drawing. Application April 25, 1940, Serial No. 331,675

2 Claims. (Cl. 219—8)

The present invention relates in general to steel alloys and in particular to a welding rod for welding ferrous alloys of special composition, especially manganese steel. The term "manganese steel" is intended to include any steel alloy containing from 11 to 14% manganese with the customary amounts of carbon, silicon, phosphorus and other alloying ingredients.

It has been found in the welding of ferrous alloys of special composition such as manganese steel that great difficulty has been encountered in the production of welds which were free from cracks and which were coherent and which at the same time adhered tenaciously to the work piece.

Therefore, the general object of the present invention is to produce a weld upon manganese steel which possesses the properties of hardness, toughness, and resistance to wear which was possessed by the original steel.

Another object of the invention is to produce welds upon manganese steel which are free from checks and cracks and which are coherent and adhere tenaciously to the manganese steel, and which are therefore resistant to shock.

A further object of the present invention is to provide a welding rod which will give greater latitude in the conditions under which arc welding may be conducted.

It is a specific object of the invention to provide a welding rod for welding manganese steel in a more economical and efficient manner than can be accomplished at the present time. Other objects of the invention will in part be obvious and will in part appear hereinafter.

According to the present invention, manganese steel is welded by use of a steel welding rod having an austenitic structure and containing copper by striking an arc between the manganese steel and the welding rod to deposit molten metal from the rod on the steel, and peening the deposited metal before it has cooled to a temperature below 750° F. to prevent the formation of checks and cracks. The welding rod of the invention comprises Manganese—from 5 to 20% preferably 11 to 14%
Copper—from 1 to 5% preferably 3 to 5%
Carbon—from 0.1 to 2% preferably 0.9 to 2%
Silicon—from 0.1 to 2% preferably 0.6 to 0.9%

Preferably the welding rod contains up to 0.2% of nickel or cobalt, and optionally up to 20% chromium, preferably less than 3% chromium.

The welding rods which I have found suitable for use in welding or rebuilding manganese steel is a manganese steel alloy rod having an austenitic structure and containing copper and preferably also containing nickel, but less nickel than copper. In particular, a rod containing chromium as well as copper and nickel, in addition to the iron, carbon, and silicon is particularly efficacious for forming tough, hard and resistant welds on manganese steel.

By way of illustration but not by way of limiting the invention, the following will be given as examples of welding rods suitable for use in the process of the invention (in parts per 100):

|  | Examples | | | | |
| --- | --- | --- | --- | --- | --- |
|  | I | II | III | IV | V |
| Manganese | 11.0 | 12.0 | 13.5 | 14.0 | 14.0 |
| Copper | 1.5 | 2.5 | 3.3 | 3.5 | 5.0 |
| Silicon | 0.6 | 0.6 | 0.85 | .9 | .95 |
| Carbon | 0.9 | 0.9 | 0.9 | .9 | .9 |
| Nickel |  | 0.1 | 0.15 | 0.2 | 0.2 |
| Chromium |  |  |  |  | 16.0 |
| Ferrous metal | (1) | (1) | (1) | (1) | (1) |

[1] Balance.

It is to be understood that a small amount of other alloying elements may be present in the welding rod, such, for example, as phosphorus, sulphur, tungsten, vanadium, aluminum, molybdenum and the like, without changing essentially the function of the rod in the present process.

It has been found that the copper present in the welding rod plays an important part in the function of the rod in the present process. In order to facilitate the welding and especially the peening, it is necessary that the weld metal possess a certain degree of ductility. Manganese steel welding rods containing, for example, nickel from 3% to 5%, but no copper give efficient welds but the weld metal has so little ductility that the welding process is rendered difficult. For instance, with such manganese-nickel alloy rods great care must be exercised to peen the deposited metal promptly so that the length of bead which can be welded is limited. It has now been discovered that the presence of copper in the welding rods causes the metal to flow at a lower temperature, imparts to the deposited metal a higher ductility and thus permits greater latitude in the welding procedure and in the time and conditions of peening the deposited metal. Moreover, the copper-containing weld metal shows a finer grain structure and shows a higher resistance to continued alternating stresses. The use of the copper enables one to eliminate or greatly reduce the amount of nickel used without reducing the amount of carbon and manganese. The decrease in the amount of nickel greatly reduces the cost of the welding rod. On the other hand, it has been found that the presence of a small amount, for example up to 0.2% nickel or cobalt functions to increase the solubility of the copper in the steel and makes it possible to expand the limits of both carbon and manganese in both directions while imparting a great hardness and toughness to the weld metal. The nickel or cobalt enables the weld to be toughened in air, reduces the brittleness and retards crystallization. The silicon protects the manganese from oxidizing in the air during the welding operation. The carbon contributes to the toughness and peen hardness and renders the weld capable of being machined, as by grinding.

The present method of welding may be used for welding manganese steel to itself or for building up worn portions of manganese steels which have been subjected to particularly hard wear and attrition and which have lost their original shape and size, or which are cracked and shattered, and which require additions of metal thereto so that the original contour and continuous surface of the piece may be restored. The invention is particularly adapted for rebuilding railway frogs and crossings which are made of manganese steel containing from about 11% to 14% manganese, together with iron, carbon, silicon and other alloying ingredients although the invention is not limited to welding manganese steel of any particular composition.

In welding, rebuilding or depositing metal from the welding rod of the invention, the surface upon which the rod metal is to be deposited should be free of oil or rust. On worn manganese steel, the worn metal is removed by grinding or chipping to expose the virgin metal and the surface brushed with a wire brush.

The work piece or the steel to be welded is connected to a source of electric current so that the work piece is negative and a second connection is fixed on the welding rod having an austenitic structure and containing copper so that the rod is positive, and an arc struck between the work piece and the rod. The rod melts away and deposits molten metal upon the work piece which is heated locally without general fusion. After deposition of a portion of the rod upon the work piece, the deposited metal is preferably subjected to impact pressure while still hot, that is while at a temperature above 750° F., preferably above 1000° F. If peened at lower temperatures, the metal is not sufficiently malleable to give a satisfactory weld. A peening or impact operation immediately after deposition of metal equivalent to about one-half the length of the usual welding rod produces a more completely adherent mass without the formation of checks and cracks than when the deposited metal has not been subjected to such peening operation. In the preferred embodiment, the peening is begun at the colder end of the deposited bead of metal, and proceeds toward the hotter end until the entire bead is peened. Further additions of the welding rod are made to the work piece and these deposited portions are in turn subjected to the peening operation until sufficient metal has been added to the piece to make it conform to the original size and shape. The finished weld may be left as peened or in the case of rebuilt rails, frogs and crossings, the welded surface may be machined off to the desired size and contour by grinding, polishing and the like.

While the welding rod of the invention is particularly adapted for rebuilding worn rails, frogs and crossings of manganese steel, it is also adapted for welding manganese to itself and for rebuilding, repairing various articles formed in whole or in part of manganese steel, such for example as worn dipper teeth, bucket lips, tool points, press plates, well-drilling bits, conveyor parts, crushing rolls, grinding devices and the like. The welding rod may be used also for building up carbon steel pieces, such, for example, as carbon steel railway frogs and switchpoints, to give a wearing surface of manganese steel.

Among the advantages of the present invention in the art of welding manganese steel is that the presence of the copper in the welding rod enables the welding to be carried out at lower temperatures than with the present nickel-containing manganese steel rods, thus reducing the chances that the manganese steel work piece will be accidentally overheated during welding. Further, since the copper-containing steel rod metal is more ductile than the nickel rod heretofore used, the metal may be peened at slightly lower temperatures than heretofore used, thus facilitating the welding operation and decreasing the speed with which the welding must be accomplished. The use of the present process is more economical, faster but requires less skill than processes of welding manganese steel with welding rods heretofore known.

I claim:

1. A welding rod for welding manganese steel comprising manganese from 5 to 20%, copper from 1 to 5%, carbon from 0.1 to 2%, silicon from 0.1 to 2% and the balance essentially iron.

2. A welding rod for welding manganese steel comprising manganese from 11 to 14%, copper from 3 to 5%, carbon from 0.9 to 2%, silicon from 0.6 to 0.9% and the balance essentially iron.

RAYMOND L. MORRISON.